United States Patent Office 3,301,588
Patented Jan. 31, 1967

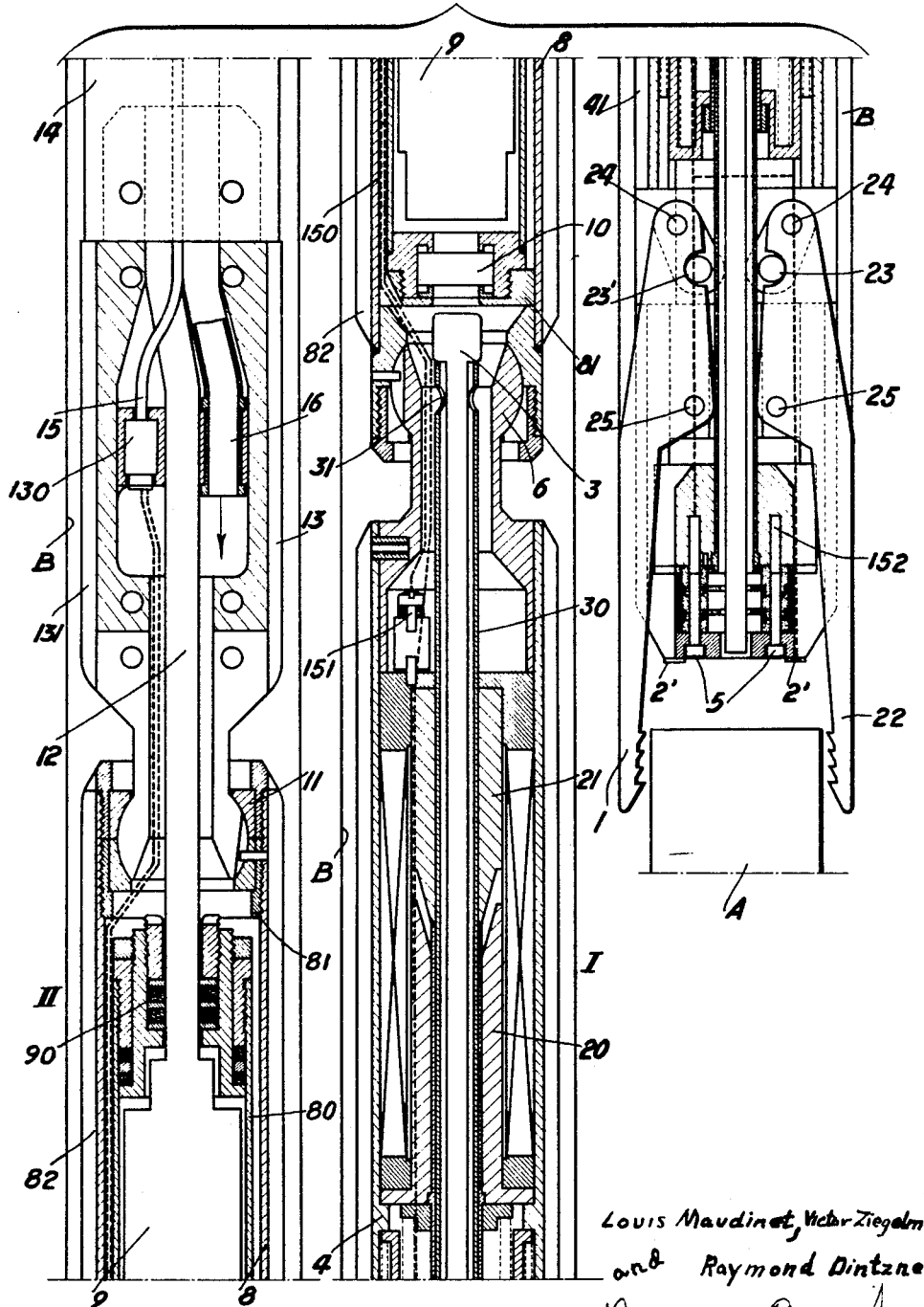

3,301,588
REMOTE CONTROL MANIPULATION OF
INACCESSIBLE OBJECTS
Louis Maudinet, Palaiseau, Victor Ziegelmeyer, Asnieres, and Raymond Dintzner, Ecouen, France, assignors to Societe Anonyme: Societe Alsacienne de Constructions Atomiques de Telecommunications et d'Electronique "Alcatel" and Societe à Responsabilite Limitee: Societe de Transactions Commerciales et Industrielles Entre la France et l'Allemagne en Abrege S.O.T.R.A.F.A., corporations, both of Paris, France
Filed Apr. 3, 1964, Ser. No. 357,074
Claims priority, application France, Apr. 5, 1963, 930,574
4 Claims. (Cl. 294—110)

The present invention relates to the manipulation, under remote control, of objects inaccessible to direct view, such as, for instance, drilling tools or parts of radiating installations such as nuclear fuel slugs or assemblys housed in channels or other portions of nuclear reactors.

The main object of the invention is to provide for the handling in such channels of objects occupying therein a wrong position, or which must be extracted from or introduced into such channels. This is the case, in particular, in nuclear reactors, where fuel slugs have sometimes to be transferred, or must be replaced on account of breakage.

Such operations have long been carried out in a "blind" fashion, using mechanical devices, moved approximately to the desired position, and automatically triggered and actuated by contact means, or by manual remote control, the final success or failure of the operation being ascertained only after resetting of the devices in their initial position.

Closed-circuit television has also been recently resorted to achieve such operations under more satisfactory and precise conditions, with a more favourable economical efficiency. Thus, in order to monitor the delicate manipulations of fuel slugs in nuclear reactors, it has been proposed to combine a television camera supported by a carrier and feeder cable, with mechanical gripping means for the slugs. This gripping device comprises a mechanical control located on both sides of the camera and the actuation thereof is effected by an arrangement perpendicular to the axis of the camera, a member of which is adapted to assure the positioning of the gripping assembly, while another member enables the handling of the gripping or clamping means; the object to be seized is illuminated by lamps located adjacent the clamping means and the objective lens of the camera, said objective being directly subjected to the radiation emitted by the object to be gripped. This radiation and the temperature prevailing at the shooting point result, in spite of the precautionary measures taken, in the rapid deterioration of the camera, to avoid this possibility, the only expedient is to shut down the reactor during such operations. Moreover, such a device presents drawbacks, since the shooting has to be made perpendicular to the axis of the object, so that the extraction of heavy parts is achieved with difficulty, unless very high clamping efforts are provided thus increasing further the expenses and difficulties of the operation.

On the other hand, since the mechanical main parts are located around the camera, it is obviously impossible to obtain an equipment with a reduced diameter, the camera itself having a comparatively large volume.

In order to obviate these drawbacks, and more particularly those resulting from the action of the radiations on the camera, and according to an essential feature of the invention, the camera is removed from the object to be handled, and an image transfer device such as an endoscope, accommodated in a clamping gripping device of known type, is interposed between said object and the camera. The improvements thus applied, according to the invention, to the remote-control manipulation of objects will thus substantially facilitate the protection of the camera against the action of a major portion of direct noxious radiation, for instance the radiations emitted by fuel assemblys, which may then be observed or manipulated, while maintaining the advantages of a powerful gripping action directed axially rather than transversally. These improvements allow, moreover, the use of cameras of very small dimensions, such as required for the work to be effected, frequently under high pressures of hot circulating fluids through small-diameter channels, while maintaining the possibility of operating with sturdy gripping means capable of providing the frequently required high tractions or thrusts. Finally, the improvements according to the present invention enable a very economical operation and maintenance since, in the particular case of a nuclear reactor, it is possible to operate the same without shutting it down, while the eventual replacement of an endoscope involves considerably smaller expenses than those resulting from a repair work of the camera with the corresponding necessary tying down thereof.

According to a preferred embodiment of the invention, a device for the remote handling and observation of a directly inaccessible object comprises a first sealed casing containing an electromagnetic gripping device or clamps of any known type, with feelers and clamping jaws surrounding the end portion an endoscope, said first casing having at one end thereof a ball-and-socket joint axially traversed, with a certain clearance, by said endoscope and connecting the same to a second sealed casing containing a television camera, the scanning tube of which is arranged to receive, through a port-hole, made of silica for example, the image transmitted by the endoscope; a second ball-and-socket joint engaged in said second casing and forming the end-portion of a third sealed casing adapted to be coupled, by any known means, to the displacement, air-conditioning and electrical supply members, as well as to receive the image cable.

The illumination of the object may be carried out by laterally arranged lamp means at the free end of the endoscope. It is also possible to use, for lighting said object, a light source located adjacent the ball and socket joint of the first casing, provided a known endoscope is made use of with a total reflexion side surface and the free end of which may be bevelled or hemispherically shaped, so as to direct the light-beam in a particular direction.

The three sealed cylindrical casings are preferably provided, in known manner, with longitudinal fins for guiding said casings in the channels wherein the device is travelling.

The third casing—the connecting casing—contains, on one hand, a multi-terminal connector to provide the electrical supply, by any known means, for the energization of the electromagnets of the gripping device, the illumination of the object and of the scanning tube, suitably arranged conduits providing the circulation of the cooling fluid around the camera and the endoscope, and a bore for the passage of the image-carrying cable, and, on the other hand, is connected to the usual devices adapted to transmit thrust and traction efforts to the gripping device intermediate the walls of the various sealed casings.

The cooling fluid may, for instance, circulate inside the endoscope through openings formed at the end portions thereof.

A preferred embodiment of the invention is described hereinafter with reference to the drawings, in which:

FIGURE 2 is a longitudinal sectional view of a preferred arrangement of the gripping device and of the endoscope.

Figure 1:
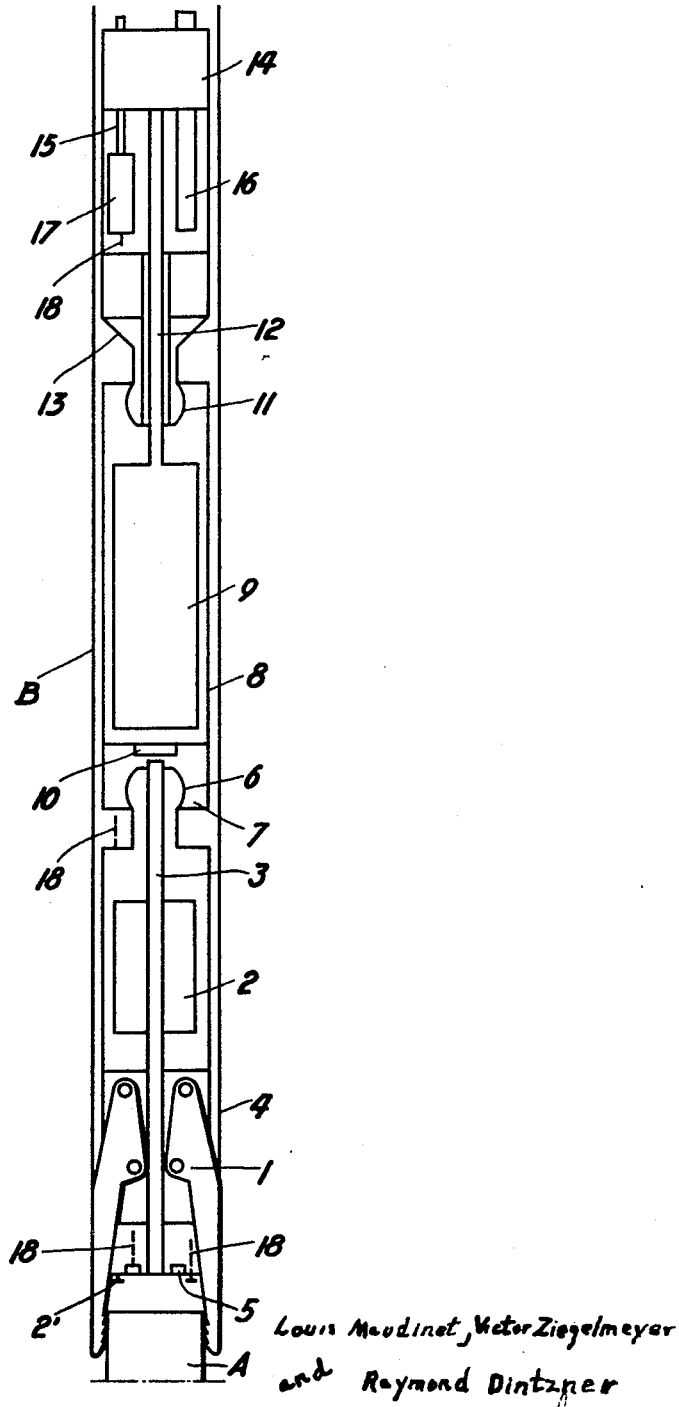
FIGURE 1 is a diagrammatic view of the device, showing the main parts of the invention.

Referring to FIGURE 1, the device according to the invention is comprised of an electromagnetic clamping pincer or gripping device 1, the mechanical control system and the plunger electromagnets 2 of which surround an endoscope 3. The gripping device 1, the control members 2 thereof and the endoscope 3 are sealed in any suitable tight manner, with a cylindrical housing 4, in the lower end of which are located lamps 5; feelers 2' enable to initiate the clamping action upon engagement thereof with the element A to be manipulated in channel B. Casing 4 extends upwardly in a male section 6 of a ball-and-socket joint 7, axially traversed, with a certain clearance, by the head of endoscope 3. The joint 7 forms the lower portion of a cylindrical casing 8 wherein is sealably enclosed a camera 9 the scanning tube of which is arranged behind a port-hole 10 of silica. The other end of casing 8 is provided with a sealed ball-and-socket joint 11, axially traversed, with a certain clearance, by the image conveying cable 12. The male section 13, of said joint 11, which has the shape of a cylindrical casing, is connected to a thrust and traction device 14 of any known type supporting feeder cables 15, cooling fluid conduits 16, and cable 12. A multi-terminal junction box 17 provides for the passage of connecting cables 18 to the electromagnets, the lighting lamps and the scanning tube. The cooling fluid conduits to extend, by means of a junction box of known type, to the open spaces formed as circulation channels and surrounding camera 9, endoscope 3 and lighting lamps 5 respectively.

A preferred embodiment of the apparatus according to the invention is illustrated in FIGURE 2, such apparatus being more particularly adapted to handle nuclear fuel slugs or assemblys, and being positioned by means of device 14. Casing 13 receives the terminals of current supply cables 15, the inlet and outlet duct 16 for a cooling fluid such as $CO_2$. The image transmission cable 12 leading to camera 9 also passes through said casing 13, and then through a sealed joint 90 forming the upper end of a protecting cylindrical housing 80 which, supported by nipples 81 and 81' and surrounding said camera, resists the pressure of the cooling gas. Said gas passes through the free space surrounding cable 12 in joint 11 and reaches the interval between housing 80 and casing 8.

The bottom of housing 80 is formed with a port-hole 10, made of silica. Adjacent the outer face of said port-hole 10, there is shown the end portion of endoscope 3, made of glass for instance, said endoscope being surrounded by a jacket 30 in which the cooling gas enters through ports 31 after leaving casing 8 through the ball-and-socket joint 7–6 around endoscope 3. In said casing 4 is located the electromagnetic mechanism 2 including a fixed magnet 20 and a core-plunger 21 formed with an axial bore for the passage of endoscope 3, which extends down to the lower portion of casing 8. Feelers 2' are arranged around the viewing end of endoscope 3, said feelers being adapted to initiate, upon engaging the assembly fuel A, the dropping of plunger 21, thus causing the gripping device 22 to pivot and clamp said fuel assembly. Said gripping device 22 comprises two jaw members symmetrically pivoted about pins 23–23' secured in casing 4 and about free pins 24 and 25, so that when a traction is exerted by device 14, said traction will be transmitted, through casings 13, 8, 4, to pivots 23–23' and cause said jaw members to automatically clamp around the fuel assembly A to be manipulated.

The current supply to the electromagnet 20–21, feeler contacts 2' and lamps 5 for illuminating the fuel assembly is provided, from the junction box 130 mounted on casing 13, by cables 150 passing, by any suitable means, into the free spaces comprised in the ball-and-socket joints 7 and 11, respectively, and by terminals 151 and 152.

The various casings 4, 8, 13 are formed on their outer portion with fins such as 41, 82, 131, adapted to assist in guiding the apparatus in channel B terminating in the housing to be explored.

It is readily seen that the manipulation of the apparatus according to the present invention is effected in a very simple and most reliable way, and that the image obtained may be observed on a screen located at any distance consistent with the permissible ranges of the image transmission cables.

What we claim is:

1. In an apparatus for the manipulation, under remote control, of inaccessible objects, an assembly comprising a television camera, a gripping device, means for moving said assembly, means for air-conditioning said assembly, means for electrical current supply and means for passing through an image conveying cable: an electromagnetically controlled gripping device including feeling members and clamping jaws, a first housing with an upper end and a lower end sealingly surrounding and supporting said gripping device, said jaws protruding downwards from said housing, a first ball-and-socket joint at the upper end of said first housing, an endoscope mounted axially in said first housing and traversing axially, with a given clearance, said ball-and-socket joint, said endoscope having an upper end and a lower end adjacent the lower end of said housing, a second sealed housing having an upper end and a lower end sealingly connected to said first ball-and-socket joint, a television camera mounted in said second housing, having a scanning tube and image transmission means, as well as a transparent port-hole located opposite the upper end of the endoscope, a second sealed ball-and-socket joint mounted on the upper end of the second housing, a third sealed housing having an upper end and a lower end sealingly connected to the second ball-and-socket joint, means comprising a lighting lamp located adjacent the endoscope to illuminate the space located in front of and between the clamping jaws, a cable traversing the first, the second and the third housings, as well as the ball-and-socket joints, in order to supply current to the lamp; means traversing the first, the second and the third housings and connected, respectively, to the electromagnetic control of the gripping device; means for feeding current to the television camera and to the scanning tube thereof, said means traversing the second and the third housings, as well as the second ball-and-socket joint, means for air-conditioning the inside space of the first, the second and the third housings, and means for moving the assembly.

2. In an apparatus for the manipulation, under remote control, of inaccessible objects, an assembly comprising a first sealed casing having clamping means attached thereto to grip a desired object, an image transferring endoscope with an end portion located in said clamping means in a position to see the object manipulated by said clamping means and the other end passing through said first sealed casing into a second sealed casing, said second sealed casing having one end attached to the end of said first sealed casing, a port hole in said second casing adjacent the end of said endoscope to view the transmitted image from said endoscope and a television camera in said second casing arranged to receive through said port hole said transmitted image, and means for moving the assembly.

3. The apparatus of claim 2, wherein said port hole is made of silica, and a third sealed casing attached to the other end of said second sealed casing containing means to air-condition said first, second and third sealed casing, said means for moving the assembly and means to receive an image cable which is attached to said camera.

4. The apparatus of claim 2, wherein a ball-and-socket joint connects said first and second sealed casings, said joint axially traversed, with an opening for said endoscope from said first sealed casing to said port hole in said second sealed casing.

References Cited by the Examiner

UNITED STATES PATENTS

| | | | |
|---|---|---|---|
| 2,355,086 | 8/1944 | Lang | 294—106 X |
| 3,021,834 | 2/1962 | Sheldon | 128—6 |

FOREIGN PATENTS 885,770  8/1953  Germany.

OTHER REFERENCES

German printed application, 1,078,245, March 1960.

GERALD M. FORLENZA, *Primary Examiner.*

G. F. ABRAHAM, *Assistant Examiner.*